United States Patent
Edwards

(10) Patent No.: US 7,453,435 B2
(45) Date of Patent: Nov. 18, 2008

(54) METHOD OF CONTROLLING AN ELECTROCHROMIC MATRIX DISPLAY AND ELECTROCHROMIC DISPLAY

(75) Inventor: Marten Edwards, Uppsala (SE)

(73) Assignee: Edwards Science & Technology, Uppsala (SE)

( * ) Notice: Subject to any disclaimer, the term of this patent is extended or adjusted under 35 U.S.C. 154(b) by 66 days.

(21) Appl. No.: 10/547,250

(22) PCT Filed: Feb. 24, 2004

(86) PCT No.: PCT/SE2004/000247

§ 371 (c)(1),
(2), (4) Date: Sep. 5, 2006

(87) PCT Pub. No.: WO2004/077139

PCT Pub. Date: Sep. 10, 2004

(65) Prior Publication Data

US 2007/0002006 A1   Jan. 4, 2007

(30) Foreign Application Priority Data

Feb. 28, 2003  (SE) .................................... 0300541

(51) Int. Cl.
G09G 3/38 (2006.01)
G02F 1/163 (2006.01)
G02F 1/15 (2006.01)

(52) U.S. Cl. .................. 345/105; 345/107; 345/690; 359/265; 359/269

(58) Field of Classification Search ............. 345/690, 345/105, 49, 107; 359/255, 259
See application file for complete search history.

(56) References Cited

U.S. PATENT DOCUMENTS

| | | | | |
|---|---|---|---|---|
| 5,049,868 A * | 9/1991 | Green et al. | ................. | 345/105 |
| 5,724,064 A * | 3/1998 | Stefik et al. | ................. | 345/105 |
| 6,831,771 B2 * | 12/2004 | Ho et al. | ..................... | 359/296 |
| 2004/0252099 A1 * | 12/2004 | Walder et al. | ............... | 345/105 |
| 2005/0253800 A1 * | 11/2005 | Johnson et al. | ............. | 345/105 |
| 2006/0066933 A1 * | 3/2006 | Jagt et al. | .................... | 359/265 |
| 2006/0097982 A1 * | 5/2006 | Arai et al. | .................... | 345/105 |
| 2007/0002006 A1 * | 1/2007 | Edwards | ..................... | 345/105 |

FOREIGN PATENT DOCUMENTS

| | | |
|---|---|---|
| WO | WO 02/12954 | 2/2002 |
| WO | WO 02/056107 | 7/2002 |
| WO | WO 02/097525 | 12/2002 |
| WO | WO 2004077139 A1 * | 9/2004 |

* cited by examiner

Primary Examiner—Amare Mengistu
Assistant Examiner—Sarvesh J Nadkarni
(74) Attorney, Agent, or Firm—Knobbe, Martens, Olson & Bear, LLP

(57) ABSTRACT

Electrochromic matrix and method of controlling the grey state of pixels in an electrochromic matrix display comprising a first set of electrodes being formed of electrically isolated conduction lines, a second set of electrodes being formed of electrically isolated conduction lines, an electrochromic material and an electrolyte being arranged between or on said first and second sets of electrodes and drive means arranged to supply drive voltages selectively to individual electrodes in said first and second sets of electrodes, said first and second sets of electrodes being arranged in a pattern such that each electrode in said first set intersect each electrode in said second set at a single location and such that electrode in said second set intersect each electrode in said first set at a single location, said intersections between the first and second sets of electrodes forming a set of pixels.

7 Claims, 1 Drawing Sheet

METHOD OF CONTROLLING AN ELECTROCHROMIC MATRIX DISPLAY AND ELECTROCHROMIC DISPLAY

RELATED APPLICATION

The present application is the U.S. national phase under 35 U.S.C. §371 of International Application No. PCT/SE2004/000247, filed Feb. 24, 2004.

TECHNICAL FIELD

The invention relates to electrochromic matrix displays and in particular a method for driving electrochromic passive-matrix displays with uniform colouration of pixels with the same greyscale state.

BACKGROUND ART

The basic unit (pixel) of an electrochromic display is an electrochemical cell that may change colour when an electric current goes through the cell. Examples of electrochromic displays are ion-intercalation displays with solid or porous films of e.g. $WO_3$ and $TiO_2$, displays with electrochromic polymer films, metal (e.g. silver) electrodeposition displays, displays with electrochromic action in the electrolyte (containing e.g. viologen molecules), and displays with viologens or other electrochromic agents anchored to the huge inner surface of a porous nanostructured metal-oxide film (e.g. a $TiO_2$ film). These and other types of electrochromic systems are described in more detail in e.g. P. M. S. Monk et al., "Electrochromism: Fundamentals and Applications", VCH, Weinheim 1995; SE0002834; U.S. Pat. No. 6,067,184; WO9835267; M. O. M. Edwards, Electrochimica Acta 46 (2001) 2187; and in references therein.

In directly addressed displays each pixel is connected by a separate electric conduction line (at least to one of the pixel electrodes) to an external drive voltage source, facilitating simultaneous individual electrical control of all pixels in the display. When the number of pixels in a display is very large, typically more than 100, it is either physically impossible or impractical to connect one separate line to each pixel. To overcome this problem the pixels are commonly arranged in a matrix structure in which they are addressed by time-multiplexing techniques via row and column lines from the matrix edges. Such displays and the methods of addressing them are denoted matrix displays and matrix addressing, respectively. In active-matrix displays all pixels are equipped with an electronic circuit with at least one field-effect transistor, diode, metal-insulator-metal diode, or another kind of non-linear electronic component. Matrix displays without pixel circuitry are called passive-matrix displays. The pixel circuitry in active-matrix displays improves the addressing properties of the pixels, however, the manufacturing of active-matrix displays is more complicated and expensive. The present invention relates to electrochromic passive-matrix displays.

A typical arrangement for an electrochromic passive-matrix display with m×n pixels is schematically described as follows. The electrochromic material, the electrolyte, films, and other components of the electrochromic cell are sandwiched between two electrodes of conductive glass. The front electrode (facing the viewer) and the back electrode are divided in m and n, respectively, electrically isolated conduction lines. The widths of the isolations are narrow compared to the widths of the conduction lines. The lines of the front and back electrodes are perpendicular with respect to each other.

A pixel is defined by the crossing between a front line and a back line. There are many variants of this basic arrangement. For instance: The front and back lines must not necessarily be perpendicular; the lines may be curved and have irregular shapes. The front and back lines may be situated on the same substrate. The electrode materials may be others than conductive glass. In addition to the isolations in the electrodes, the pixels may be further isolated from the surrounding pixels by seals, patterned structures in films, etc.

Several addressing schemes for passive-matrix displays are known. Time-varying electric signals are applied on the conduction lines of both electrodes. Typically the lines of one of the electrodes (e.g. the front electrode) are used as select lines to select a group of pixels for receiving colour information from the data lines, i.e. the conduction lines of the other electrode. In the most straightforward addressing scheme (SCHEME 1) this is carried out by applying one of two voltages ($U_{SELECT}$ or $U_{UNSELECT}$) on the select lines and one of two voltages ($U_{DARK}$ or $U_{LIGHT}$) on the data lines. Pixels along one of the select lines are selected by applying $U_{SELECT}$ on this particular select line and $U_{UNSELECT}$ on all other select lines. The voltages on the data lines to the selected pixels are $U_{DARK}$ for dark pixels and $U_{LIGHT}$ for light pixels. After a certain time $t_{line}$ the selected line is changed and new information ($U_{DARK}$, $U_{LIGHT}$) is applied on the data lines according to the colour states of the pixels along the new selected line. This procedure is repeated until all m select lines in the matrix have been selected once. The process of scanning through all select lines is called a frame. A frame is immediately followed by a new frame as long as an image is shown. The same voltage sequences of $U_{DARK}$ and $U_{LIGHT}$ are applied on the data lines in all frames as long as the image is not changed. When the image is changed new voltage sequences are applied on the data lines. To avoid flickering the frame time $t_{FRAME}$ (m×$t_{line}$) is often shorter than ⅟₆₀ s.

SCHEME 1 is an example of a single-line addressing scheme. It works well for e.g. certain liquid-crystal displays and is described in "Liquid Crystal Displays" by Ernst Lueder (ISBN 0471 49029 6). The basic idea is that dark pixels are darkened only when they are selected and that the darkness to a large extent remains during one frame until next time the pixel is selected. The light state is here taken as the "normal state" for unselected pixels, but the opposite situation is also possible (is taken for granted in the discussion throughout the text). For SCHEME 1 to work properly the display type should preferably show (1) a sufficiently sharp threshold in the colour-voltage relation as well as (2) a short-circuit memory during the non-selected part of a frame. The first condition is to assure that only the applied pixel voltage $U^{pixel}=U_{SELECT}-U_{DARK}$ corresponds to a dark state, whereas the three other possible voltage differences ($U_{SELECT}-U_{LIGHT}$, $U_{UNSELECT}-U_{DARK}$, $U_{UNSELECT}-U_{LIGHT}$) correspond to light states. The second condition is to assure that the obtained dark state for a selected pixel that is darkened is to large extents unaffected by the applied pixel voltages ($U_{UNSELECT}-U_{DARK}$, $U_{UNSELECT}-U_{LIGHT}$) during the time of the frame it is not selected.

An alternative single-line addressing scheme (SCHEME 2) uses three voltages ($U_{SELECT-DARK}$, $U_{UNSELECT}$, $U_{SELECT-LIGHT}$) on the select lines and two voltages (as in SCHEME 1) on the data lines. The 'normal' colour state in this scheme is 'grey' (something between dark and light). Briefly the scheme is based on superframes consisting of two different kinds of frames: dark frames and light frames. The applied voltages on unselected lines are $U_{UNSELECT}$ (as in SCHEME 1) in both, whereas $U_{SELECT-DARK}$ and $U_{SELECT-LIGHT}$ are applied on the selected lines during dark and light frames, respectively. $U_{DARK}$ and $U_{LIGHT}$ are applied on the data lines to dark and light pixels, respectively, in both kinds of frames. The intention is, however, that dark and light pixels are mainly darkened and lightened, respectively, in the dark and light frames. In other respects SCHEME 2 works like SCHEME 1.

Another kind of addressing than single-line addressing is multiple-line addressing. In multiple-line addressing schemes several select lines are selected simultaneously. Multiple-line addressing schemes for liquid-crystal displays are described in "Liquid Crystal Displays" by Ernst Lueder (ISBN 0471 49029 6). The electric signals on the select lines in those schemes are voltage waveforms that, in a mathematical respect, are orthogonal to each other.

The following definitions are used throughout the text: Pixels along the same select line are in the same row. Pixels along the same data line are in the same column. Pixels with different visual colour impressions are in different "greyscale states". For instance, greyscale states can be black, dark grey, light grey, and white as well as blue, green, and red. We will also use the term greyscale state for pixels that in an image switch are changing from one greyscale state to another one. Pixels that change from yellow to blue are in a yellow→blue state whereas pixels in which a red colour is kept are in a red state (or red→red state). We will also talk about 'desired' greyscale states. We will then mean that the desired greyscale states of, e.g., yellow→blue and red states are blue and red, respectively.

A known problem (see EP0000616) when SCHEME 1 is applied on electrochromic passive-matrix displays with two greyscale states (light, dark) is related to the greyscale uniformity of the pixels in the matrix. The greyscale state of a dark pixel is dependent on the number of dark pixels in its column. The more dark pixels in a column, the darker appearance of the dark pixels in that column. Consider, as an illustrating example, a matrix with 7 rows and 5 columns. The voltage across an unselected pixel is (neglecting the resistances in the select and data lines) either $U_{UNSELECT}-U_{DARK}$ or $U_{UNSELECT}-U_{LIGHT}$. A dark pixel in a column with 5 dark pixels will in the unselected periods of a frame experience 4 periods of $U_{UNSELECT}-U_{DARK}$ and 2 periods of $U_{UNSELECT}-U_{LIGHT}$. As a comparison, a dark pixel in a column with only 1 dark pixel will experience $U_{UNSELECT}-U_{LIGHT}$ in all 6 unselected periods. From this it is obvious that the voltage driving of a pixel in the unselected periods of a frame is dependent on the number of dark pixels in the pixel's column. As a result of this, matrix displays that lack "short-circuit memory" will have non-uniform greyscales. (By short-circuit memory we mean that the pixel colour is not affected by the applied pixel voltages in the unselected periods of a frame. Note that the greyscales for a matrix display with perfect short-circuit memory would be uniform with SCHEME 1.)

A driving method SCHEME 4 for overcoming the said greyscale uniformity problem is disclosed in EP0000616. In SCHEME 4 the line addressing periods in SCHEME 1 are divided in two equally long sub-periods A and B. Voltage waveforms with different voltages in A and B are used for $U_{SELECT}$, $U_{DARK}$ and $U_{LIGHT}$, whereas $U_{UNSELECT}$ always is 0 V in both A and B. $U_{DARK}$ and $U_{LIGHT}$ are, respectively, +U' and -U' in A and -U' and +U' in B. In this way the time-average of the pixel voltage in a line-addressing period, $<U^{pixel}>$, becomes always 0 V for all unselected pixels in the matrix. For example, $<U^{pixel}>=<U_{UNSELECT}-U_{DARK}>=((0-U')+(0+U'))/2 V=0 V$ for an unselected dark pixel. As $<U^{pixel}>$ is the same for all unselected pixels, the greyscale states of dark pixels will be independent of the number of dark pixels in a column, provided that the bleaching is a proper function of only $<U^{pixel}>$. A drawback of the method is that pixels only are darkened in one of the sub-periods A and B. For a matrix with 7 rows, this means that dark pixels are actively darkened only 1/14 of a frame, as compared to 1/7 of a frame with SCHEME 1. The maximum contrast between dark and light pixels will therefore be lower with SCHEME 4 than with SCHEME 1. This is the price one pays for the better contrast uniformity with SCHEME 4.

One problem with prior art (SCHEME 4) is that the contrast between dark and light pixels is low. Another problem is that no methods for more than two greyscale states are provided. Another problem is that no methods for fast image switching are provided.

DISCLOSURE OF INVENTION

The object of the invention is to provide methods for driving electrochromic passive-matrix displays with high and uniform contrast.

Another object of the invention is to provide methods for driving greyscale electrochromic passive-matrix displays.

Another object of the invention is to provide driving methods for fast switching of electrochromic passive-matrix displays.

These objects are solved by a principal method for addressing electrochromic matrix displays according to the characterising portion of claim 1. Unlike prior art, the invention uses electric addressing signals on the data lines that are calculated individually for each data line as a function of the distribution of greyscale states of the pixels in the associated column. The select and unselect signals on the select lines are, however, as in prior art, independent of the displayed image. The invention is intended for either preserving a given image or switching between images. In the former case the less restrictive choice of the data line signals facilitates higher contrast than in prior art as well as uniform contrast across the matrix (as in prior art). In the latter case the invention provides means of applying more extreme pixel voltages for short time periods to speed up the switching between different greyscale states for pixels in the display. Finally the invention provides means for preserving and switching images with more than two greyscale states.

MODE(S) FOR CARRYING OUT THE INVENTION

Embodiment 1

Figure 1:
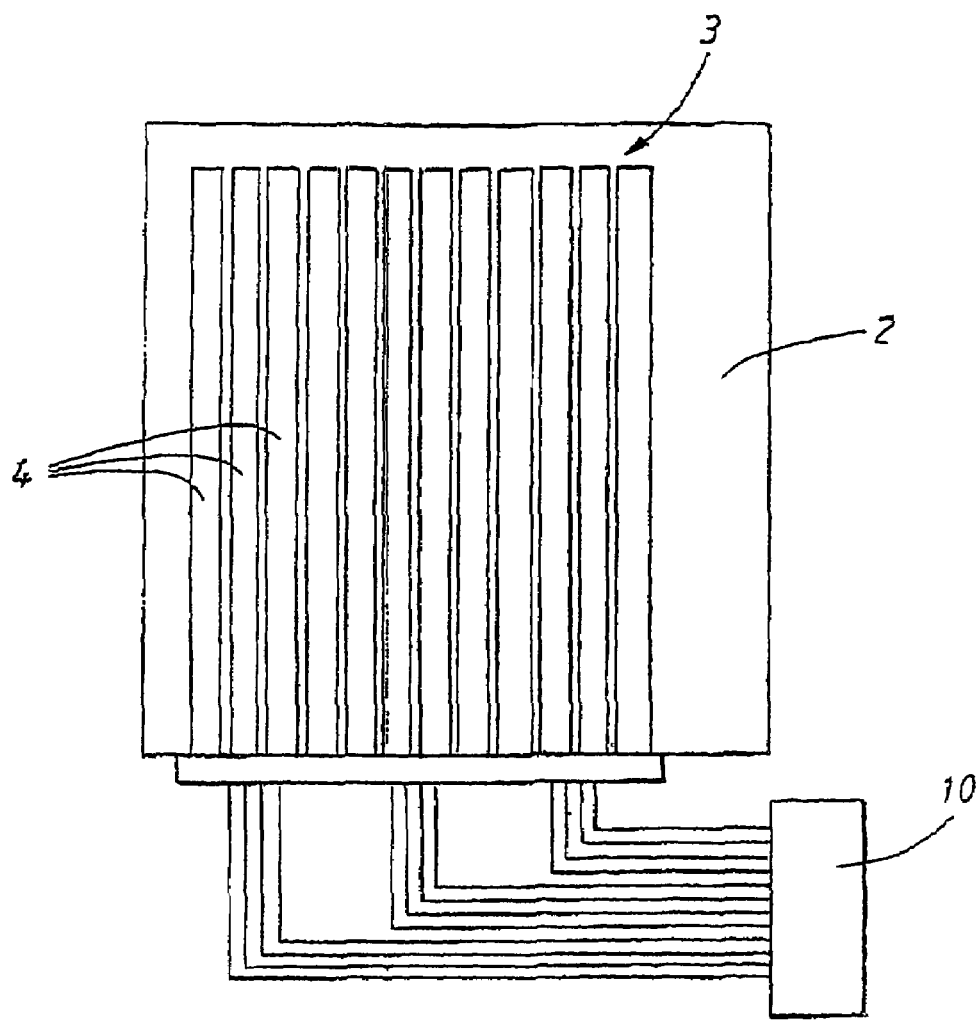
FIG. 1 is a schematic drawing of a substrate carrying a first set of electrodes.

In embodiment 1 the invented method is used to preserve image patterns in an electrochromic matrix display with only two greyscale states (dark and light). In this embodiment the method is identical to SCHEME 1 in all respects except the choice of electric signals on the data lines. These are, as in SCHEME 1, voltage waveforms with two different voltages $U_{DARK}$ and $U_{LIGHT}$ that are applied on the data lines to selected dark and light pixels, respectively. However, in embodiment 1 $U_{DARK}$ is different for different data lines. $U_{DARK}$ has a monotonic dependence on the number of dark pixels in the column: $U_{DARK}(X)=U'_{DARK}+\Delta U(X)$, where $U'_{DARK}$ is a constant, x is the number of dark pixels in the column, and $\Delta U$ is a function of x. $\Delta U$ is chosen such that the contrast between dark and light pixels becomes uniform across the matrix for arbitrary image patterns. The absolute value of $\Delta U$ is increasing with increasing x. The sign of $\Delta U$ is such that the absolute value of ($U_{DARK}-U_{LIGHT}$) always decreases with increasing x. Furthermore the value of $\Delta U$ is limited by the condition that the difference $U_{DARK}-U_{LIGHT}$ should have the same sign for all possible x, i.e., from x=0 to x=m. The time-average pixel voltage $<U^{pixel}>$ is not a constant in embodiment 1, neither in a single line addressing period nor in the unselected periods of a frame. Thus the mechanism of attaining uniform contrast in embodiment 1 is clearly different from prior art (SCHEME 4). In a preferred variant the dependence of $U^{DARK}(X)$ on x is linear, i.e., $U^{DARK}(X)=U'^{DARK}+x\Delta U$, where $\Delta U$ is a constant.

According to one embodiment of the invention, the grey-state of pixels in an electrocromic matrix is controlled according to the following:

the electrochromic pixels have at least two electrodes.
one of said electrodes is connected to a select line, and the other said electrode is connected to a data line.
The pixels in one row (along one select line) are selected during a line addressing period $t_{line}$ by applying a voltage $U_{SELECT}$ on the associated select line and $U_{UNSELECT}$ on all other select lines. In subsequent line addressing period another row is selected. New rows are selected until a frame is completed, i.e., then all m rows in the matrix have been selected once. Then another frame follows.
Voltages $U_{DARK}$ and $U_{LIGHT}$ are applied on data lines of dark and light selected pixels, respectively. $U_{DARK}$ is linearly dependent on x, the number of dark pixels in the column: $U_{DARK}=U'_{DARK}+(\Delta U)_x$, where $U'_{DARK}$ and $\Delta U$ are constants. The updating of the data line voltages is synchronized with the change of select line.
$U'_{DARK}$, $\Delta U$, $U_{LIGHT}$, $U_{SELECT}$, $U_{UNSELECT}$, and $t_{line}$ are chosen such that the contrast between dark and light pixels in an arbitrary image pattern is uniform across the matrix.

Embodiment 2

Time-Division of the Line Addressing Periods

This embodiment is as embodiment 1 intended for preserving images in an electrochromic matrix display with two greyscale states. It is also based on SCHEME 1 but differs from embodiment 1 in two fundamental ways: Firstly, the same two voltages $U_{LIGHT}$ and $U_{DARK}$ are used on all data lines irrespective of the distribution of dark and light pixels in the columns. Secondly, each line addressing period is divided in two unequally long sub-periods, A and B. The voltages on the data lines $U^{data}$ are $U_{DARK}$ in A and $U_{LIGHT}$ in B. For selected light pixels the time in A, $t_A$, equals 0 and the time in B, $t_B$, equals $t_{line}$. For selected dark pixels the time-division between A and B depends on x. $t_B$ is equal to $t_{line}$ for a selected dark pixel in a column where only this pixel is dark, i.e., x=1. $t_B$ decreases monotonically for increasing x but reaches never zero. In a variant the dependence of $t_B$ on x is linear, i.e., $t_B=t_{line}+(x-1)\Delta t$, where $\Delta t$ is a negative constant.

Embodiment 3

Scheme with Three Select-Line Voltages

This embodiment is a variant of embodiment 1 for matrix displays with two greyscale states (dark, light). The principal difference is that it is based on SCHEME 2. SCHEME 2 is modified in a similar way as SCHEME 1 is modified for embodiment 1. In the dark frames $U_{DARK}$ is changed into $U_{DARK}(x)=U'_{DARK}+\Delta U_{DARK}(x)$ whereas $U_{LIGHT}$ is constant in all columns, $U_{LIGHT}=U'_{LIGHT}$. In the light frames the situation is reversed: $U_{DARK}=U'_{DARK}$ and $U_{LIGHT}(x)=U'_{LIGHT}+\Delta U_{LIGHT}(x)$. The values of $\Delta U_{DARK}(x)$ and $\Delta U_{LIGHT}(x)$ are restricted in the same manner as in embodiment 1. Furthermore, as in embodiment 1 preferred variants $\Delta U_{DARK}(x)$ and $\Delta U_{LIGHT}(x)$ are both linearly dependent on x.

It is also obvious that the time-division of the line-adressing periods in embodiment 2 may be applied also on SCHEME 2 such that a uniform contrast is attained in all columns.

Embodiment 4

Greyscale Operation

If a superframe of several frames is used, all previous embodiments can be used to drive matrix displays with more than two greyscale states. The actual greyscale state of a pixel is then dependent on the applied data line signals when the pixel is selected in the different frames. For instance, assume that a superframe consists of k-1 frames of the type in embodiment 1. Then it is possible to display k greyscale states (from 0 to k-1). A pixel that experiences $U_{LIGHT}$ in all frames when selected will be in greyscale state g=0, a pixel that experiences $U_{DARK}$ in 5 frames when selected will be in g=5, etc.

Alternatively greyscales may be attained in driving schemes with only one kind of frame by generalizing the x-dependencies in the previous embodiments to dependencies on both the greyscale state g of a particular pixel and the distribution of greyscale states in the pixel's column: $x_0$, $x_1$, ..., $x_{k-1}$, where $x_i$ is the number of pixels in state i in the column and k is the total number of greyscale states. We will only discuss a variant in which embodiment 1 is generalized to k greyscale states. The data line voltages $U_{LIGHT}$ and $U_{DARK}=U'_{DARK}+\Delta U_{DARK}(x)$ are turned into a function $U^{data}=f(g, x_0, x_1, \ldots, x_{k-1})$. $U^{data}$ has a monotonic dependence on all individual $x_i$ values as well as the greyscale state g of the selected pixel. The function f is chosen such that uniform greyscale states are attained across the matrix for arbitrary image patterns. One variant has a linear dependence on g:

$$U^{data} = (gU_{DARK} + (k-1-g)U_{LIGHT})/(k-1)$$
$$= (gU'_{DARK} + g\Delta U(x_0, x_1, \ldots x_{k-1}) + (k-1-g)U_{LIGHT})/(k-1).$$

For the special case of k=2 this expression turns into the same $U^{data}$ voltages as in embodiment 1: $U'_{DARK}+\Delta U(x)$ and $U_{LIGHT}$. In another variant $U^{data}$ is linearly dependent on all individual $x_i$ values:

$$U^{data}=U'(g)+\Delta U(g)\Sigma\{ix_i/(k-1)\},$$

where the dependence on the degree of colouration is accounted for by a sum from i=1 to m of all pixels weighted by their greyscale level. In still another variant $U^{data}$ is linearly dependent on all individual $x_i$ values and g:

$$U^{data}=(gU'_{DARK}+g\Delta U\Sigma\{ix_i/(k-1)\}+(k-1-g)U_{LIGHT})/(k-1)$$

$\Delta U$ is in this variant a constant. Again, for k=2, this expression equals the corresponding ones in embodiment 1, $U^{data}=gU'_{DARK}+g\Delta Ux+(1-g)U_{LIGHT}$. For g=0 and g=1 this gives $U_{LIGHT}$ and $U'_{DARK}+\Delta Ux$, respectively.

General Aspects on Preserving Image Patterns

All previous embodiments are mainly intended for preserving given image patterns. This can be done by repeating the same frame (or superframe) as long as the image pattern is displayed. For displays with good colour memory it is possible to make breaks (e.g. electrically disconnect all or some of the data and select lines) between frames or between line addressing periods within a frame.

Embodiment 5

Switching

The simplest way of switching image pattern is to just change the signals on the data lines to the signals for the new image, while the select line signals are unchanged and the frames (or superframes) are repeated in the same manner (with or without breaks etc.) as before the image switch. In this embodiment, however, the image switching is made faster by applying a special switching procedure with more extreme drive-voltage conditions for a limited time. Some examples of such switching procedures for matrix displays with only two greyscale states based on embodiments 1 and 3 are described below. They can however be modified for greyscale operation (embodiment 4) or operation with time-division of the line-addressing periods (embodiment 2).

(a) Switching procedure in three steps. First, the same voltage is applied on all pixels for a limited time to put all pixels in the light state. This is done by keeping the same voltage on all select lines and the same, but another, voltage on all data lines. Second, a limited number of "switching frames" for the new image of the same type as in embodiment 1 are applied, however, the driving voltages are chosen such that the speed of the darkening is faster than it would be with the proper driving voltages for preserving images (as in embodiment 1). The extreme driving conditions in the present case would possibly cause electrochemical damage if the time for the switching frames was not limited in time. Third, when the greyscale changes are complete or almost complete the driving voltages are changed to the normal voltages for preserving the new image according to embodiment 1.

(b) Switching in two steps with three voltages on the select lines as in embodiment 3. In the first step extreme voltage conditions are applied for a limited number of switching frames to obtain faster switching. The kind of voltages applied on the data lines may differ in some respects from embodiment 3. For example, it may be advantageous to apply the following voltages on selected pixels in the light and dark frames:

| Greyscale change of selected pixel | $U^{data}$ in dark frame | $U^{data}$ in light frame |
|---|---|---|
| Dark → dark | $U_{LIGHT}$ | $U_{DARK}$ |
| Light → light | $U_{LIGHT}$ | $U_{DARK}$ |
| Dark → light | $U_{LIGHT}$ | $U_{LIGHT}$ |
| Light → dark | $U_{DARK}$ | $U_{DARK}$ |

Thus, for unchanged pixels the most extreme pixel voltages ($U_{SELECT-LIGHT}-U_{LIGHT}$ and $U_{SELECT-DARK}-U_{DARK}$) are avoided. The reason for avoiding the most extreme voltages for unchanged pixels is two-fold: First, extreme voltages in the dark (or light) direction will cause all pixels to be darker (or lighter). Second, extreme voltages in the dark direction may cause electrochemical damage of a pixel in a dark greyscale state (similar effects in the light greyscale direction). In the second step the normal voltages for the new image are applied according to the following table:

| Greyscale state of selected pixel in the new image | $U^{data}$ in dark frame | $U^{data}$ in light frame |
|---|---|---|
| light | $U_{LIGHT}$ | $U_{LIGHT}$ |
| dark | $U_{DARK}$ | $U_{DARK}$ |

Device

The inventive method is operated on an electrochromic matrix display comprising a first set of electrodes being formed of electrically isolated conduction lines, a second set of electrodes being formed of electrically isolated conduction lines, an electrochromic material and an electrolyte being arranged between said first and second sets of electrodes and drive means arranged to supply drive voltages selectively to individual electrodes in said first and second sets of electrodes. A substrate 1 carrying a first set of electrodes are shown in FIG. 1. At least one of the first and second sets of electrodes (as well as the associated electrode substrate) should be transparent or semi-transparent.

The display comprises a first substrate 2 bearing a conductive pattern 3. The substrate 2 usually consists of a relatively rigid non-conductive material, for example glass, but it is possible to make the substrate 2 from a non-conductive flexible material, for example a plastic material. The conductive pattern 3 is preferably made from a layer of conductive or semiconductive material which is borne by the substrate 2, material being machined away to form a conductive pattern 3. According to an embodiment, use is made of glass plates coated with a thin layer of F-doped $SnO_2$. The conductive pattern is connected to drive means arranged to supply drive voltages selectively to individual electrodes.

The inventive method may be applied for operation of many different kinds of electrochromic matrix displays. Electrochromic matrix displays based on nanostructured films are unknown. In the following such devices are described in detail. The inventive method is particularly suited for such devices.

The conductive pattern 3 bears a working electrode material 4. The working electrode material 4 consists of an electrically conducting or semiconducting porous nanostructured film (according to the definition in SE518964), preferably consisting of metal-oxide particles which are equipped with electrochromic species attached to the surface of the particles. Electrochromic displays with such films are described in Cummins, D. et al, J. Phys. Chem. B104, 11449-11459; SE0002834; M. O. M. Edwards, Electrochimica Acta 46 (2001) 2187; SE518964; U.S. Pat. No. 6,067,184; WO9835267; and in references therein. The working electrode material 3 will be connected to drive means 10 in a known manner when the display 1 is assembled.

The working electrode material preferably consist(s) of an electrically conductive or semiconductive porously nanostructured film which is manufactured from a semiconductive metal oxide, preferably an oxide or peroxide of one or some of the following metals: titanium, zirconium, hafnium, chromium, molybdenum, tungsten, vanadium, tantalum, silver, zinc, tin, strontium, iron, cobalt, wolfram, ruthenium, niobium or nickel.

The display 1 also comprises a second substrate 5 bearing a layer 6 of conductive or semiconductive material. The substrate 5 usually consists of a relatively rigid non-conductive material, for example a glass, but it is possible to make the substrate 5 from a non-conductive flexible material, for example a plastic material. According to an embodiment, use is made of glass plates coated with a thin layer of doped $SnO_2$. The second substrate 5 may bear a counterelectrode material 7 of various kinds (e.g. another nanostructured film, as disclosed in). The electrochemical function of the second set of electrodes and their associated counterelectrode materials is to supply ionic current to the first set of electrodes. The display is sealed by a sealing material 9. Also the counterelectrode material 7 is connected to drive means 10 in a manner known to the skilled in the art.

According to a preferred embodiment of the invention, the electrochromic matric display is formed from a first and second substrate of the type shown in FIG. 1, where one substrate is rotated 90° in relation to the other such that the conductive electrodes are orthogonally arranged in respect of each other.

Figure 2:
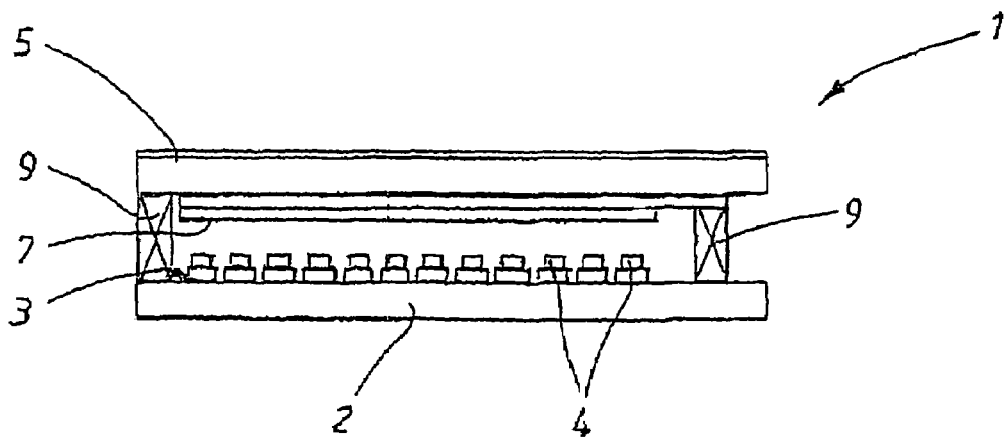
FIG. 2 is a cross section of two substrates as described in FIG. 1 arranged orthogonally with respect to each other and forming a matrix display.

A cross section of such an arrangement is shown in FIG. 2.

A first specific reflective matrix display variant based on the above design using nanostructured films on the first set of electrodes has been found to give particularly good results when driven by the methods in embodiments 1 and 3. This variant is described in the following: The front and back electrodes are made of conductive glass with a thin conducting layer of F-doped tin oxide. The conduction lines of the front electrode are completely covered by a porous nanostructured film of titanium dioxide nanoparticles across the whole active image area (the isolation lines are not covered). Viologen molecules are attached to the surface of the particles in the porous film (the film is several microns thick). On top of the nanostructured film is another porous film, consisting of non-absorbing light-scattering particles, attached. This film covers completely the nanostructured film. The conduction lines of the back electrode are not covered with additional material. Immersed in the volume between the electrodes (also in the pores of the porous films) is an electrolyte consisting of the solvents 2-methoxy propionitrile (80% by weight) and ethanol (20% by weight), the inert salt lithium triflate (0.2 M), the redox-active compound ferrocene (50 mM), and 3% by weight of tert-buthyl pyridine. Displays of this type, with either 3 rows and 3 columns or 5 rows and 7 columns, show particularly high and uniform contrast between dark and light pixels for a wide variety of image patterns when operated by the preferred method in embodiment 1 with linear x-dependency of $U_{DARK}$ (and the preferred method in embodiment 2 with linear x-dependencies of $U_{DARK}$ and $U_{LIGHT}$).

Some comments on the described first specific device: The colour impression is favoured by the positioning of the light-scattering film close to the front electrode, as disturbing colouration of the ferrocene-ferrocenium redox couple in this way is reduced. The present electrolyte composition is based on the electrolyte used in WO9835267. Fundamental differences between the electrolytes are that the present electrolyte contains an alcohol (ethanol) and a strong Lewis base (tert-buthyl pyridine). Such additives improve significantly the contrast between dark and light pixels.

In a second specific matrix display variant based on the above design the conduction lines of the back electrode are covered by a porous nanostructured film of Sb-doped $SnO_2$ particles. The front electrode is designed as in the first specific matrix display variant above. The electrolyte contains the solvent 2-methoxy propionitrile and the salt lithium triflate. Displays of this type are also preferably operated by the disclosed methods of the present invention.

In a third specific matrix display variant based on the above design a solid film (thinner than 100 nm) of electrically insulating material (e.g. $Al_2O_3$) is placed between the conduction lines of the front electrode and the nanostructured film of titanium dioxide particles. In other respects this matrix display variant is like the second specific matrix display variant above. The insulating film causes the electric current-voltage response of the pixel elements to, at least partly, resemble the response of an electric metal-insulator-metal (MIM) device. MIM devices are sometimes used as the active electronic components in the pixels of active-matrix displays. In the present case the two metal films in the MIM device is replaced by the conduction lines and the $TiO_2$ particles in the nanostructured film, respectively. Displays of this type are also preferably operated by the disclosed methods of the present invention.

The invention claimed is:

1. A method of controlling the grey state of pixels in an electrochromic matrix display comprising a first set of electrodes formed of electrically isolated conduction lines, a second set of electrodes formed of electrically isolated conduction lines, an electrochromic material arranged between or on said first and second sets of electrodes and a drive arranged to supply drive voltages selectively to individual electrodes in said first and second sets of electrodes, said first and second sets of electrodes being arranged in a pattern such that each electrode in said first set intersects each electrode in said second set at a single intersection and each electrode in said second set intersects each electrode in said first set at a single intersection, said intersections between the first and second sets of electrodes forming a set of pixels, wherein said method comprises the steps of:
providing select or unselect signals from said drive to one of said sets of electrodes, said electrodes forming select lines, wherein the select or unselect signals, which are independent of the desired image pattern, are applied on the select lines to select and unselect groups of pixels along their respective select line;

providing data signals from said drive to the other set of electrodes, said electrodes forming data lines, wherein the data signals, which are applied on the data lines to affect greyscale states of selected pixels, are dependent on the desired image pattern;

wherein the electric signal for a particular greyscale state on a particular data line is a function of the distribution of the greyscale states of the pixels along said particular data line;

wherein one of two constant voltages $U_{DARK}$ and $U_{LIGHT}$ are applied on a particular data line, wherein $U_{DARK}$ is applied if the greyscale state of the selected pixel along the data line belongs to one group of greyscale states and $U_{LIGHT}$ is applied if the greyscale state of the selected pixel along the data line belongs to another group of greyscale states;

wherein only two possible greyscale states of the pixels exist;

wherein $U_{DARK}$ is a monotonic function of the number of desired dark pixels along the data line and $U_{LIGHT}$ is a constant.

2. A method according to claim 1, wherein $U_{DARK}$ is linearly dependent on the number of desired dark pixels along the data line.

3. A method of controlling the grey state of pixels in an electrochromic matrix display comprising a first set of electrodes formed of electrically isolated conduction lines, a second set of electrodes formed of electrically isolated conduction lines, an electrochromic material arranged between or on said first and second sets of electrodes and a drive arranged to supply drive voltages selectively to individual electrodes in said first and second sets of electrodes, said first and second sets of electrodes being arranged in a pattern such that each electrode in said first set intersects each electrode in said second set at a single intersection and each electrode in said second set intersects each electrode in said first set at a single intersection, said intersections between the first and second sets of electrodes forming a set of pixels, wherein said method comprises the steps of:

providing select or unselect signals from said drive to one of said sets of electrodes, said electrodes forming select lines, wherein the select or unselect signals, which are independent of the desired image pattern, are applied on the select lines to select and unselect groups of pixels along their respective select line;

providing data signals from said drive to the other set of electrodes, said electrodes forming data lines, wherein the data signals, which are applied on the data lines to affect greyscale states of selected pixels, are dependent on the desired image pattern;

wherein the electric signal for a particular greyscale state on a particular data line is a function of the distribution of the greyscale states of the pixels along said particular data line;

in which only one select line is selected at a time;

wherein one of two constant voltages $U_{DARK}$ and $U_{LIGHT}$ are applied on a particular data line, wherein $U_{DARK}$ is applied if the greyscale state of the selected pixel along the data line belongs to one group of greyscale states and $U_{LIGHT}$ is applied if the greyscale state of the selected pixel along the data line belongs to another group of greyscale states;

wherein both $U_{DARK}$ and $U_{LIGHT}$ are constants for all data lines and the data signals to the data lines are time-divided under a select signal period in two sub-periods A and B with $U_{DARK}$ and $U_{LIGHT}$, respectively, on, wherein the relative times in said sub-periods ($t_A$ and $t_B$) control the greyscale states of the selected pixels.

4. A method of controlling the grey state of pixels in an electrochromic matrix display comprising a first set of electrodes formed of electrically isolated conduction lines, a second set of electrodes formed of electrically isolated conduction lines, an electrochromic material arranged between or on said first and second sets of electrodes and a drive arranged to supply drive voltages selectively to individual electrodes in said first and second sets of electrodes, said first and second sets of electrodes being arranged in a pattern such that each electrode in said first set intersects each electrode in said second set at a single intersection and each electrode in said second set intersects each electrode in said first set at a single intersection, said intersections between the first and second sets of electrodes forming a set of pixels, wherein said method comprises the steps of:

providing select or unselect signals from said drive to one of said sets of electrodes, said electrodes forming select lines, wherein the select or unselect signals, which are independent of the desired image pattern, are applied on the select lines to select and unselect groups of pixels along their respective select line;

providing data signals from said drive to the other set of electrodes, said electrodes forming data lines, wherein the data signals, which are applied on the data lines to affect greyscale states of selected pixels, are dependent on the desired image pattern;

wherein the electric signal for a particular greyscale state on a particular data line is a function of the distribution of the greyscale states of the pixels along said particular data line;

wherein the matrix display is operated in frames, each frame corresponding to a pre set basic time period having a duration remaining until all select lines have been selected once for an equally long time, and wherein the display is operated in two different subframes and the select signals on selected lines are different in the two subframes.

5. A method according to claim 4, wherein selected pixels are affected in different greyscale directions in the two different subframes.

6. A method of controlling the grey state of pixels in an electrochromic matrix display comprising a first set of electrodes formed of electrically isolated conduction lines, a second set of electrodes formed of electrically isolated conduction lines, an electrochromic material arranged between or on said first and second sets of electrodes and a drive arranged to supply drive voltages selectively to individual electrodes in said first and second sets of electrodes, said first and second sets of electrodes being arranged in a pattern such that each electrode in said first set intersects each electrode in said second set at a single intersection and each electrode in said second set intersects each electrode in said first set at a single intersection, said intersections between the first and second sets of electrodes forming a set of pixels, wherein said method comprises the steps of:

providing select or unselect signals from said drive to one of said sets of electrodes, said electrodes forming select lines, wherein the select or unselect signals, which are independent of the desired image pattern, are applied on the select lines to select and unselect groups of pixels along their respective select line;

providing data signals from said drive to the other set of electrodes, said electrodes forming data lines, wherein the data signals, which are applied on the data lines to affect greyscale states of selected pixels, are dependent on the desired image pattern;

wherein the electric signal for a particular greyscale state on a particular data line is a function of the distribution of the greyscale states of the pixels along said particular data line;

wherein the matrix display is operated in frames, each frame corresponding to a pre set basic time period having a duration remaining until all select lines have been selected once for an equally long time, wherein a sequence of k−1 frames are subsequently applied to attain images with k greyscale states ranging from 0 to k−1 and wherein pixels in greyscale state g are selected in g of the k−1 frames;

wherein the display is operated in two different subframes and the select signals on selected lines are different in the two subframes.

7. A method according to claim 6, wherein selected pixels are affected in different greyscale directions in the two different subframes.

* * * * *